(12) United States Patent
Furukawa et al.

(10) Patent No.: US 8,033,735 B2
(45) Date of Patent: Oct. 11, 2011

(54) AXLE BEARING ASSEMBLY

(75) Inventors: Keiichi Furukawa, Nara (JP); Shigeaki Furusawa, Yokohama (JP); Yutaka Koma, Hachioji (JP); Shigeru Inoue, Yokohama (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 574 days.

(21) Appl. No.: 12/222,043

(22) Filed: Jul. 31, 2008

(65) Prior Publication Data

US 2009/0034894 A1 Feb. 5, 2009

(30) Foreign Application Priority Data

Aug. 2, 2007 (JP) ................ 2007-201849

(51) Int. Cl.
*F16C 33/72* (2006.01)
*F16C 33/76* (2006.01)
(52) U.S. Cl. .................... 384/477; 384/487
(58) Field of Classification Search .......... 384/446, 384/448, 473, 477, 480, 486, 487; 277/586, 277/571–572; 324/173–174
See application file for complete search history.

(56) References Cited

U.S. PATENT DOCUMENTS

| | | | | |
|---|---|---|---|---|
| 3,129,985 A * | 4/1964 | Watson | ............... | 384/486 |
| 3,586,404 A * | 6/1971 | Zahn | ............... | 384/482 |
| 3,757,554 A * | 9/1973 | Kida et al. | ............... | 72/43 |
| 4,408,808 A * | 10/1983 | Redmann et al. | ............... | 384/473 |
| 4,783,180 A * | 11/1988 | Hayashi | ............... | 324/173 |
| 4,792,243 A * | 12/1988 | Takeuchi et al. | ............... | 384/486 |
| 4,948,277 A | 8/1990 | Alff | | |
| 5,002,287 A * | 3/1991 | Eskilsson | ............... | 277/568 |
| 5,863,124 A | 1/1999 | Ouchi et al. | | |
| 6,077,166 A * | 6/2000 | Reynolds | ............... | 464/133 |
| 7,063,193 B2 * | 6/2006 | Yoshida | ............... | 277/572 |
| 7,201,685 B2 * | 4/2007 | Terada et al. | ............... | 384/486 |
| 7,591,593 B2 * | 9/2009 | Tsujimoto | ............... | 384/486 |
| 2002/0170795 A1* | 11/2002 | Yasui et al. | ............... | 192/35 |
| 2005/0259902 A1 | 11/2005 | Ohtsuki et al. | | |

FOREIGN PATENT DOCUMENTS

| | | |
|---|---|---|
| JP | 04-186604 | 7/1992 |
| JP | 07-174147 | 7/1995 |
| JP | 09-329615 | 12/1997 |
| JP | 11-201979 | 7/1999 |
| JP | 2002267680 A * | 9/2002 |

OTHER PUBLICATIONS

European Search Report dated Feb. 23, 2009.

* cited by examiner

*Primary Examiner* — Marcus Charles
(74) *Attorney, Agent, or Firm* — McGinn IP Law Group, PLLC

(57) ABSTRACT

An axle bearing assembly includes a flange, on which a wheel is mounted; a hub shaft constructed of a cylindrical portion provided on an inboard side of the flange; a bearing having an inner ring; an outer ring; and rolling elements disposed between the inner ring and the outer ring; a first sealing member fixed to an inboard side between the inner ring and the outer ring; and a removable second sealing member is fitted to the inboard side of the first sealing member. The inner ring of the bearing portion is fixed to the cylindrical portion of the hub shaft.

15 Claims, 6 Drawing Sheets

AXLE BEARING ASSEMBLY

INCORPORATION BY REFERENCE

The disclosure of Japanese Patent Application No. 2007-201849 filed on Aug. 2, 2007 including the specification, drawings and abstract is incorporated herein by reference in its entirety.

BACKGROUND OF THE INVENTION

1. Field of the Invention

The invention relates to an axle bearing assembly for an automobile or the like, and more particularly, to an axle bearing assembly that is equipped with a sealing member for preventing outside contaminants from infiltrating into an inner side of the bearing portion.

2. Description of the Related Art

More and more for axles bearing assemblies are being used in vehicles such as pickup trucks. In such vehicles, higher resistance to outside contaminants is required. In a bearing portion of the axle bearing assembly, sealing members are conventionally fitted to gaps on an inner side and an outer side between an inner ring and an outer ring to prevent the outflow of lubricant and the infiltration of outside contaminants. However, the sealing member prevents outside contaminants from infiltrating the gaps on the inner side. Thus, when the sealing member deteriorates due to longtime use, outside contaminants may infiltrate the bearing portion.

In a conventional axle bearing assembly an oil seal is fitted in a gap between an inner end of a wheel hub and an axle housing, and an oil catcher is bolted to the inside of a flange of the wheel hub in such a manner as to cover the gap (e.g., see Japanese Patent Application Publication No. 11-201979 (JP-A-11-201979)).

In the axle bearing assembly described in JP-A-11-201979, the oil seal is fitted to the opening on the inner side of the bearing portion, and the oil catcher covers the oil seal. However, there is a wide gap between the oil seal and the oil catcher. Therefore, it is still possible for outside contaminants to infiltrate the bearing portion from this gap when the oil seal deteriorates.

SUMMARY OF THE INVENTION

The invention provides an axle bearing assembly that has a simple structure and is maintenance-free over a long period by being equipped with sealing members capable of preventing outside contaminants from infiltrating into a bearing portion of the bearing assembly over a long period.

An axle bearing assembly according to a first aspect of the invention is equipped with a flange on with a wheel is mounted, a hub shaft, constructed of a cylindrical portion, provided on an inboard side of the flange, a bearing portion having an inner ring, an outer ring, and a rolling element disposed between the inner ring and the outer ring, a first sealing member fixed to an inboard side between the inner ring and the outer ring, and a removable second sealing member disposed at an inboard side of the first sealing member. The inner ring of the bearing portion is fixed to the cylindrical portion of the hub shaft.

The second sealing member is composed of a circular metal plate having a fitting hole which is formed at provided at a central portion of the metal plate, and which has a diameter sufficient to loosely fit an outer periphery of the inner ring of the bearing portion therein, and a cover portion which is formed generally in a shape of U toward an outboard side, and which is accommodated in a gap between the inner ring and the outer ring on an inboard side of the bearing portion in such a manner that the cover portion does not rotate relative to the outer ring to cover the gap.

An axle bearing assembly according to a second aspect of the invention is equipped with an inner ring fixed to a stationary shaft; an outer ring on which a wheel is mounted on an outboard side thereof; a rolling element disposed between the inner ring and the outer ring; a first sealing member fixed to an inboard side of the bearing assembly between the inner ring and the outer ring; and a removable second sealing member disposed to an inboard side of the first sealing member.

The second sealing member is composed of a circular metal plate having a fitting hole which is formed at provided at a central portion of the metal plate, and which has a diameter sufficient to loosely fit an outer periphery of the inner ring of the bearing portion therein, and a cover portion which is formed generally in a shape of U toward an outboard side, and which is accommodated in a gap between the inner ring and the outer ring on an inboard side of the bearing portion in such a manner that the cover portion does not rotate relative to the outer ring for covering the gap.

The second sealing member is provided with an annular pulser portion or a cylindrical pulser portion.

According to the first aspect and/or the second aspect of the invention, the removable second sealing member disposed at the inboard side of the bearing portion is provided in the gap between the inner ring and the outer ring of the bearing portion. Therefore, the first sealing member is not directly exposed to outside contaminants. Thus, the first sealing member can be restrained from being damaged over a long period. Further, the second sealing member is removable. Therefore, the bearing portion including the first sealing member may be continuously used over a long period substantially in a maintenance-free manner by simply replacing only the second sealing member at the time of maintenance. In addition, the second sealing member may be provided with a pulser portion. Therefore, the detection of a rotational speed may be carried out with a simple structure.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Figure 1:
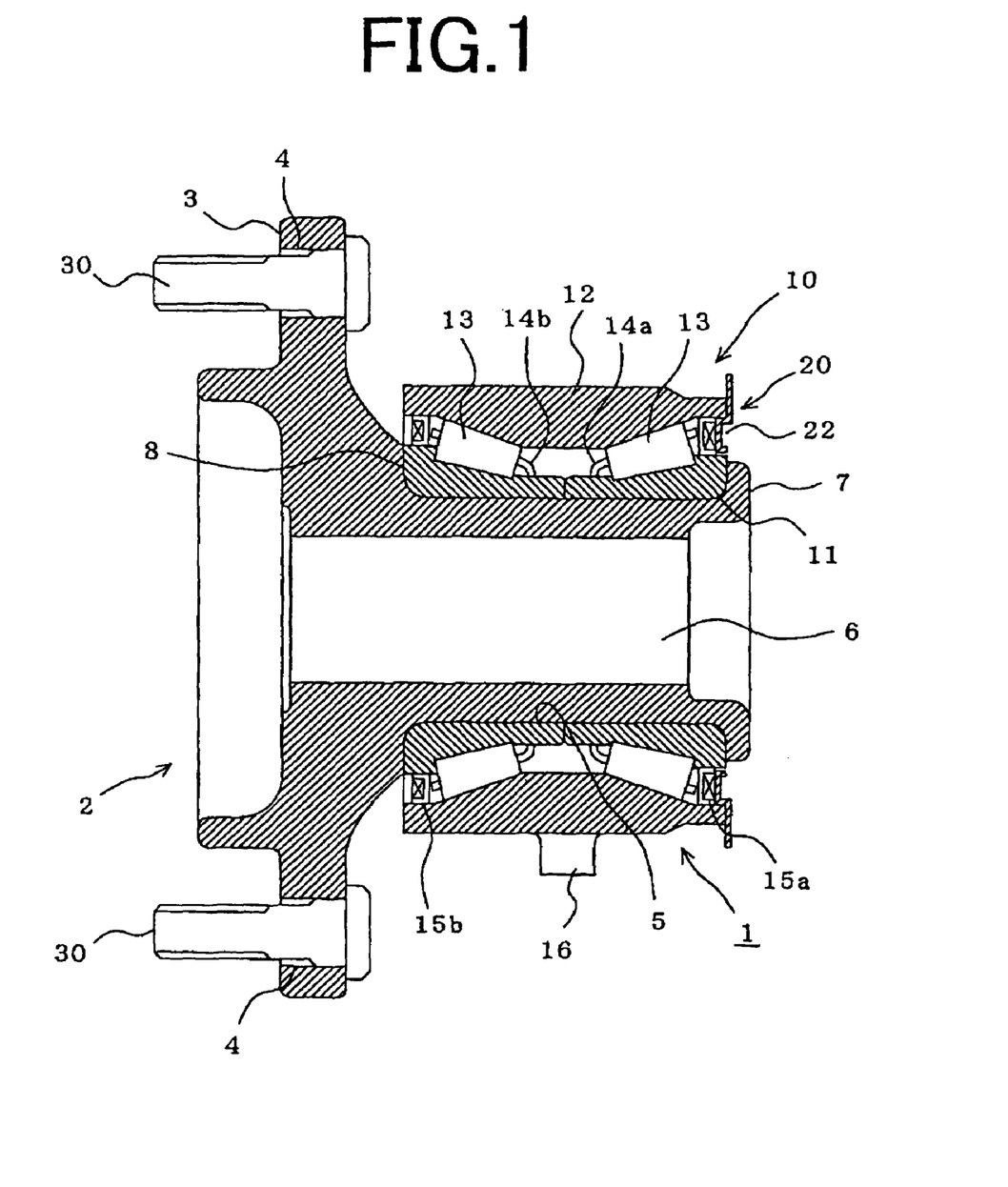
FIG. 1 is a longitudinal sectional view of an axle bearing assembly according to the first embodiment of the invention.

FIG. 1 is a longitudinal sectional view of an axle bearing assembly according to the first embodiment of the invention.

Figure 2:
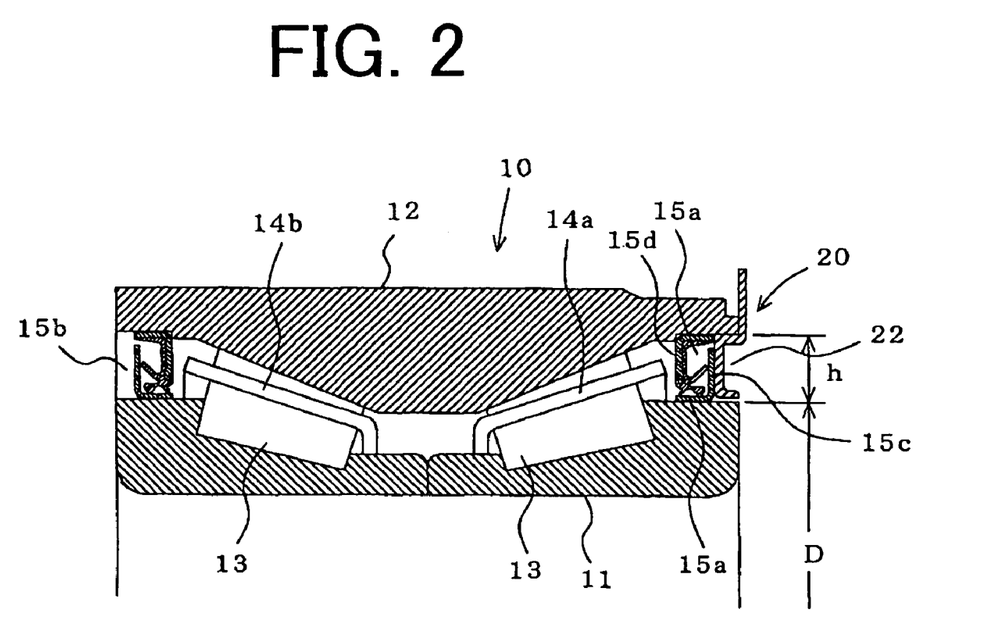
FIG. 2 is a sectional view of a bearing portion as shown in FIG. 1.

FIG. 2 is an enlarged view of a bearing portion of FIG. 1. In this embodiment of the invention, the bearing portion has a rotating inner ring. In the following description, the right side and the left side in FIGS. 1 and 2 are referred to as the inboard side and the outboard side respectively.

As shown in FIGS. 1 and 2, in an axle bearing assembly 1, a flange 3 having a plurality of bolt holes 4 is provided along an outer periphery on the outboard side of a hub shaft 2 made of a steel material. Bolts 30 for mounting a wheel (not shown) are press-fitted through the plurality of bolt holes 4 formed in the flange 3. The flange 3 is provided at a central portion of the hub shaft 2. The hub shaft 2 also includes cylindrical portion 5 which is disposed at a central portion of the flange 3 and which that protrudes toward the inboard side, and to which a bearing portion 10 is fitted. The cylindrical portion 5 has a through-hole 6 formed through a central portion of the cylindrical portion 5. A drive shaft is generally fitted in the through-hole 6.

The bearing portion 10 is comprised of an inner ring 11 made of a steel material, an outer ring 12 made of a steel material, and tapered rollers 13 made of a steel material. The inner ring 11 is divided into two parts and has rolling contact surfaces (raceway surfaces). The outer ring 12 is provided with two rows of rolling contact surfaces that correspond to the rolling contact surfaces of the inner ring 11. The tapered rollers 13 are rolling elements that are held in pockets of cages 14a and 14b respectively and disposed in two rows between the rolling contact surfaces of the inner ring 11 and the outer ring 12. One of the two divided parts of the inner ring 11 may be constructed integrally with the hub shaft 2, and the other may be constructed of a separate member. First sealing members 15a and 15b are fitted respectively to gaps on the inboard and outboard side between the inner ring 11 and the outer ring 12.

Each of the sealing members 15a and 15b is a pack seal formed in a packed state through combination of a slinger 15c and a sealing annular body 15d. After the inner ring 11, the outer ring 12, the cages 14a and 14b, and the rolling elements 13 are put together, the sealing members 15a and 15b are fitted into the gap between the inner ring 11 and the outer ring 12. Accordingly, it is necessary to disassemble the bearing portion 10 in order to remove the pack seals (the sealing members 15a and 15b). Therefore, it is extremely difficult to carry out maintenance. For lubrication, grease and oil are encapsulated in the bearing portion 10.

On the inboard side of the bearing portion 10, a removable second sealing member is disposed at the inboard side of the first sealing member 15a. The second sealing member 20 is formed by, for example, pressing a metal plate exhibiting elasticity like a stainless steel plate or a surface-treated steel plate. The second sealing member 20 has an outer diameter that is approximately equal to or slightly larger than the diameter of an inner peripheral face of an inboard-side end of the outer ring of the bearing portion 10.

Figure 3A:
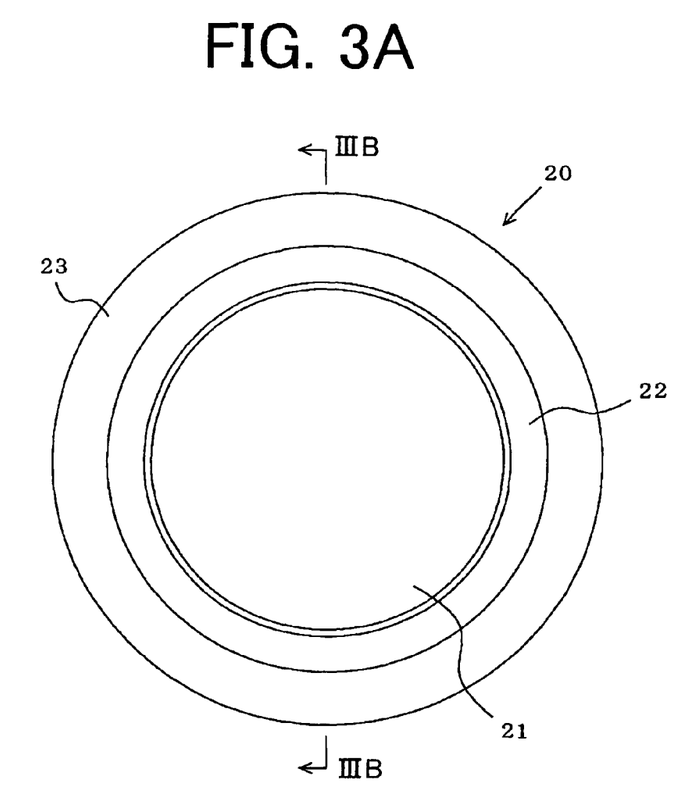
FIGS. 3A and 3B are a plan view of a second sealing member of FIG. 1 and a sectional view thereof taken along a line IIIB-IIIB respectively.
Figure 3B:
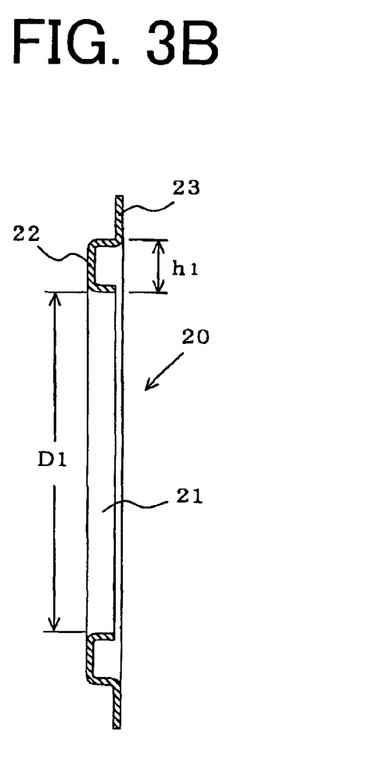

As shown in FIGS. 3A and 3B, a fitting hole 21 having an inner diameter D1 slightly larger than an outer diameter D of the inner ring 11 of the bearing portion 10 is provided through a central portion of the second sealing member 20. A peripheral edge of the fitting hole 21 is bent generally in the shape of U toward the outboard side to form a cover portion 22. A tip of the cover portion 22 is bent radially outward to provide an extended portion 23. The cover portion 22 is formed with a height h1 that is slightly lower than a height h of the inboard-side gap between the inner ring 11 and the outer ring 12 of the bearing portion 10.

In the second sealing member 20, as shown in FIG. 2, the inner ring 11 on the inboard side is loosely fitted in the fitting hole 21, and the cover portion 22 is press-fitted in the inboard-side gap between the inner ring 11 and the outer ring 12 so that an outer peripheral face of the cover portion 22 contacts an inner peripheral face of the outer ring 12 on the inboard side of the first sealing member 15a. Thus, the cover portion 22 is accommodated in the gap relatively non-rotatably with respect to the outer ring 12, with the outer peripheral face of the cover portion 22 fixed to the inner peripheral face of the outer ring 12. The outer ring 12 may be fitted to the fitting hole 21 using a screw or the like. That is, any structure in which the axle bearing assembly may be easily mounted and removed without being disassembled at the time of maintenance is acceptable.

Next, an example of a procedure of assembling the axle bearing assembly 1 will be described. First, the inner ring 11 of the bearing portion 10 is press-fitted into the cylindrical portion 5 of the hub shaft 2 from the inboard side, and an inboard-side end of the cylindrical portion 5 is bent toward an outer periphery side of the cylindrical portion 5 and caulked (a caulked portion 7). Thus, the bearing portion 10 is fixed with an axial force applied between the bearing portion 10 and a step portion 8 provided on the outboard side. The removable second sealing member 20 is then press-fitted into the gap between the inner ring 11 and the outer ring 12 of the bearing portion 10.

The drive shaft (not shown) is then inserted into the through-hole 6 of the hub shaft 2 and fixed to the hub shaft 2. Thus, in the axle bearing assembly 1, which is fitted with the drive shaft, a flange 16 provided on the outer ring 12 of the bearing portion 10 is non-rotatably fixed to an axle case or the like, and the hub shaft 2, which includes the drive shaft and the inner ring 11 of the bearing portion 10, are rotatably supported.

In this embodiment of the invention, outside contaminants may be prevented from infiltrating the bearing portion 10 by the first sealing member 15b on the outboard side of the bearing portion 10, and by the second sealing member 20 and the first sealing member 15a on the inboard side of the bearing portion 10.

According to this embodiment of the invention, the second sealing member 20, which is press-fitted to the outer ring 12 and has the cover portion 22 that covers the gap between the inner ring 11 and the outer ring 12, is provided on the inboard side of the bearing portion 10 of the axle bearing assembly 1, which is likely to be splashed by outside contaminants. Therefore, outside contaminants are unlikely to directly splash on the first sealing member 15a. Thus, damage to the first sealing member 15a is minimized, and outside contaminants can be prevented over a long period from infiltrating the bearing portion 10 from the inboard side. Accordingly, the axle bearing assembly, which is maintenance-free over a long period and highly reliable, can be obtained. Further, the second sealing member 20, which is likely to be splashed by outside contaminants and hence may be damaged at the time of use, may be easily mounted on and removed from the bearing portion 10. Therefore, only the second sealing member 20 may be easily replaced at the time of maintenance. The first sealing member 15a, which is relatively difficult to replace, continues to be restrained over a long period from being damaged. Thus, the bearing portion can be continuously used substantially in a maintenance-free manner. As a result, the cost of maintenance is drastically reduced.

Figure 4:
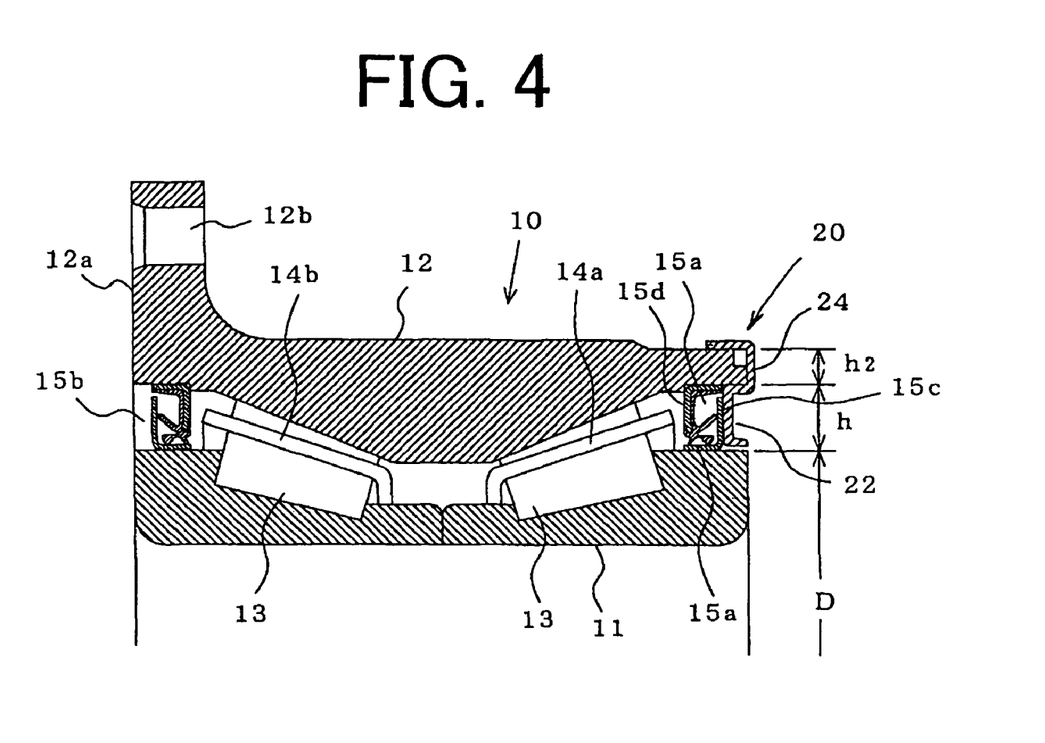
FIG. 4 is a sectional view of a bearing portion of an axle bearing assembly according to the second embodiment of the invention.

FIG. 4 is a sectional view of a bearing portion 10 of an axle bearing assembly 1 according to the second embodiment of the invention. Parts identical to or performing the same functions as those of the first embodiment of the invention are denoted by the same reference symbols and will not be fully described below. The first embodiment of the invention shows the case where the bearing portion 10 having a rotating inner ring is provided with the second sealing member 20. In this embodiment of the invention, however, the bearing portion 10 having a rotating outer ring is provided with the second sealing member 20.

In this embodiment of the invention, a flange 12a having a plurality of bolt holes 12b into which bolts (not shown) for mounting a wheel are press-fitted is provided on the outboard side of the outer ring 12 of the bearing portion 10. As with the first embodiment of the invention, the second sealing member 20 is formed by, for example, pressing a metal plate exhibiting elasticity like a stainless steel plate or a surface-treated steel plate. The second sealing member 20 is formed with an outer diameter slightly larger than the diameter of an inner peripheral face of an inboard-side end of the outer ring 12 of the bearing portion 10.

Figure 5A:
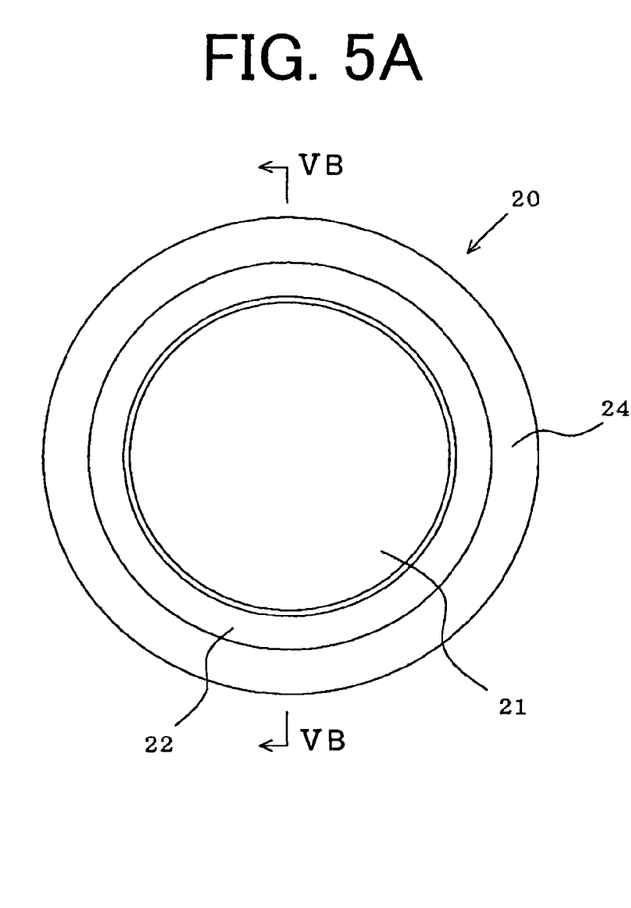
FIGS. 5A and 5B are a plan view of a second sealing member of FIG. 4 and a sectional view thereof taken along a line VB-VB respectively.
Figure 5B:
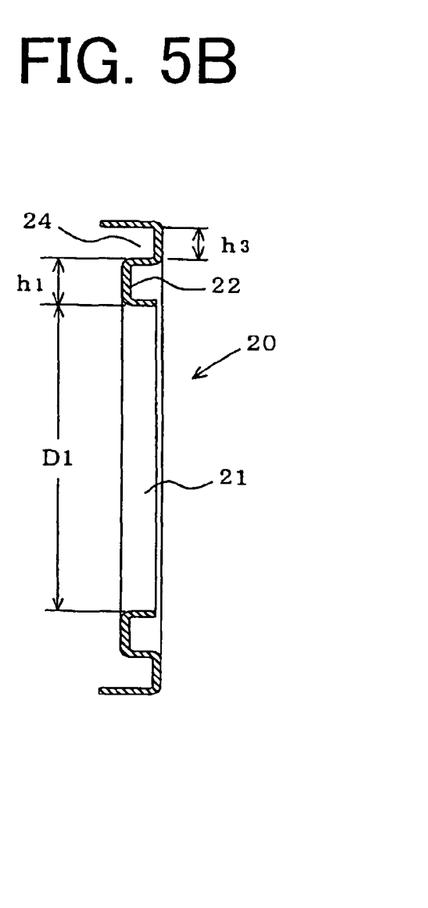

As shown in FIGS. 5A and 5B, the fitting hole 21 having the inner diameter D1 slightly larger than the outer diameter D of the inner ring 11 of the bearing 10 portion is provided in the central portion of the second sealing member 20. The peripheral edge of this fitting hole 21 is bent in the shape of U toward the outboard side generally to form the cover portion 22. The tip of the cover portion 22 on the inboard side is bent radially outward and then again toward the outboard side to form a generally U-shaped clamping portion 24. The tip of the outer peripheral edge of the U-shaped clamping portion 24 extends in the outboard direction beyond of the cover portion 22. The clamping portion 24, which may be regarded as a press-fitted portion, is formed with an inner edge having a height h3 that is approximately equal to or slightly below the height (thickness) h2 of the outer ring 12 on the inboard side. The clamping portion 24 not limited to being formed in a U shape. Any other shape is acceptable as long as the clamping portion 24 is press-fitted to the outer ring 12. That is, any structure is possible as long as the second sealing member 20 may be easily mounted and removed at the time of maintenance.

In the second sealing member 20 as shown in FIG. 4, the clamping portion 24 is press-fitted and fixed to the inboard-side end of the outer ring 12 of the bearing portion 10, and the fitting hole 21 is loosely fitted to the outer periphery of the inner ring 11. Thus, the cover portion 22 is press-fitted and accommodated in the gap on the inboard side between the inner ring 11 and the outer ring 12, and hence covers the gap relatively non-rotatably with respect to the outer ring 12. The clamping portion 24 may be fitted to the outer ring 12 by a screw or the like.

In the bearing portion 10 provided with the second sealing member 20, for example, the inner ring 11 may be fixed to a stationary shaft or a sleeve fitted to the stationary shaft, and the outer ring 12 rotates together with the second sealing member 20 with the wheel that is mounted on the bolts, which are press-fitted in the bolt holes 12b of the flange 12a. Then, the second sealing member 20 effectively prevents outside contaminants from infiltrating the bearing portion 10 from the inboard side. Therefore, outside contaminants are prevented from directly splashing on to the first sealing member 15a. The operation and effect of this embodiment of the invention are almost identical to those of the first embodiment of the invention.

Figure 6:
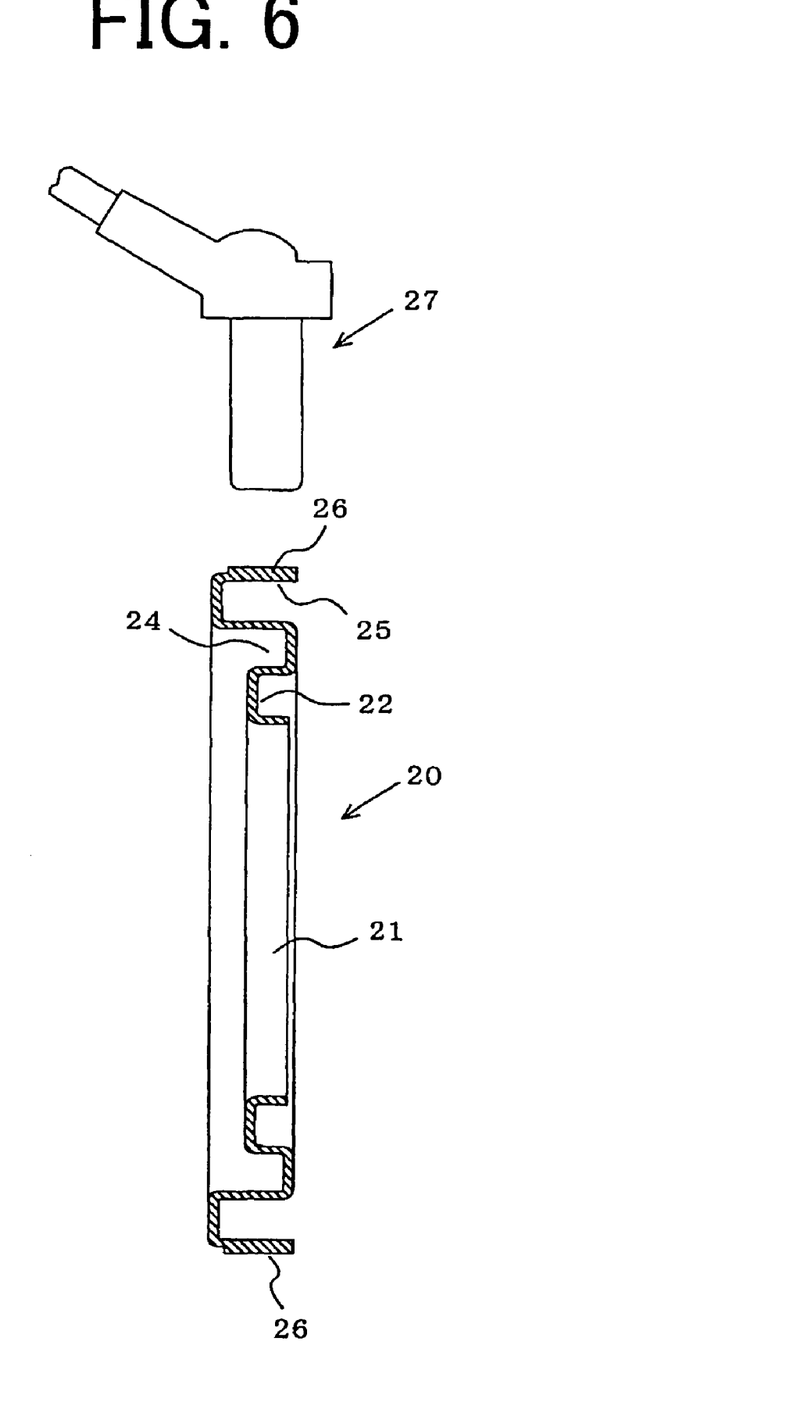
FIG. 6 is a sectional illustrative view of a second sealing member provided for a bearing portion of the axle bearing assembly according to the third embodiment of the invention.

FIG. 6 is an illustrative view of an axle bearing assembly according to the third embodiment of the invention. In the third embodiment of the invention, the outboard-side end of the clamping portion 24 is bent radially outward and then toward the inboard side to form a substantially horizontal cylindrical outer periphery portion 25. A large number of convexo-concave portions 26 in the form of gears, waves, comb teeth, or the like are formed along an outer peripheral face of the outer periphery portion 25 in a circumferential direction thereof to provide a cylindrical pulser portion having a function similar to that of a pulser ring. Alternatively, instead of this cylindrical pulser portion, another pulser portion may be provided by forming a large number of the convexo-concave portions 26 on the second sealing member 20 annularly (in the form of a circular plate) along the circumferential direction of an end face thereof. The pulser portion may perform the same pulser function as that of a magnetization type, which is formed by fixing a magnetized rubber material or a plastic material.

A rotational speed sensor 27 is disposed near the axial bearing assembly. For example, the rotational speed sensor 27 includes a detection coil wound around a yoke, and a magnet. The rotational speed sensor 27 is fixed to a stationary portion such as a knuckle or the like. The tip of the rotational speed sensor 27 is disposed near the outer periphery 25 of the second sealing member 20.

In the bearing portion 10 equipped with the second sealing member 20 as described above, the outer ring 12 rotates together with the wheel, and the outer periphery portion 25 of the second sealing member 20 provided with the pulser portion rotates within a certain magnetic field produced by the magnet provided in the rotational speed sensor 27. Thus, an inductive pulse signal is generated at both ends of the coil due to a change in magnetic flux resulting from a change in magnetic path between the yoke of the rotational speed sensor 27 and the outer periphery portion 25. Therefore, the measurement of this pulse signal makes it possible to detect a rotary motion (number of rotations, speed, direction, and the like) of the outer ring 12 and hence the rotary motion of the wheel.

The foregoing description shows the case where a detection coil wound around the yoke and the magnet is built into the rotational speed detecting sensor 27, and the pulse signal generated at both the ends of the coil due to the change in magnetic flux between the rotational speed detecting sensor 27 and the outer periphery portion 25 having the pulser portion is measured to detect rotation. However, a rotational speed sensor that detects the rotational speed by other means such as a magnetic resistance element or a Hall element may also be used.

According to this embodiment of the invention, an operation and an effect similar to those of the second embodiment of the invention are achieved. In addition, the outer periphery portion 25 of the second sealing member 20 provided for the bearing portion 10 is provided with the pulser portion. Therefore, rotation may be reliably detected using a simple structure, without fitting the outer ring 12 with a pulser ring, which is not only heavy but also troublesome to manufacture and assemble.

The foregoing description shows the case where the second sealing member 20 is provided on the inboard side of the bearing portion 10 of the axle bearing assembly 1 shown in the drawings. However, the invention is not limited to this case but can also be implemented for axle bearing assemblies having having a different structure and bearing portions having other structures. Although the example in which a tapered roller bearing is used as the bearing portion 10 has been illustrated, other bearings such as ball bearings and the like may also be used.

What is claimed is:
1. An axle bearing assembly comprising:
a flange on which a wheel is mounted;

a hub shaft, constructed of a cylindrical portion, provided on an inboard side of the flange;

a bearing portion equipped with an inner ring that is fixed to the cylindrical portion of the hub shaft, an outer ring, and a rolling element disposed between the inner ring and the outer ring;

a first sealing member that is fixed to an inboard side between the inner ring and the outer ring; and a removable second sealing member that is disposed at an inboard side of the first sealing member, the second sealing member including a cover portion which is formed generally in a U-shape toward an outboard side, and which is accommodated in a gap between the inner ring and the outer ring on an inboard side of the bearing portion in such a manner that the cover portion does not rotate relative to the outer ring to cover the gap, wherein a portion of the second sealing member is disposed inboard of an inboard-side end of the outer ring of the bearing portion.

2. The axle bearing assembly according to claim 1, wherein the second sealing member is composed of a circular plate which includes a fitting hole which is formed at a central portion of the circular plate, the cover portion covering the gap between the inner ring and the outer ring and a press-fitted portion which is press-fitted in the outer ring.

3. The axle bearing assembly according to claim 1, wherein the second sealing member further comprises a circular metal plate including a fitting hole which is formed at a central portion of the metal plate, and which has a diameter sufficient to loosely fit an outer periphery of the inner ring of the bearing portion therein, and the cover portion.

4. The axle bearing assembly according to claim 1, wherein a gap is formed between an axially outermost portion of the cover portion and an axially innermost portion of the first sealing member.

5. The axle bearing assembly according to claim 1, wherein the second sealing member is disposed so as to not contact the first sealing member.

6. The axle bearing assembly according to claim 1, wherein the second sealing member further comprises an extended portion extending radially outward from the cover portion, the outer flange portion being disposed inboard of the inboard-side end of the outer ring of the bearing portion.

7. The axle bearing assembly according to claim 6, wherein the second sealing member further comprises a clamping portion, a portion of the clamping portion being disposed radially outward of a radially outermost portion of the inboard-side end of the outer ring of the bearing portion.

8. The axle bearing assembly according to claim 1, wherein the cover portion comprises a radial height which is less than a radial height of the gap.

9. The axle bearing assembly according to claim 1, wherein the clamping portion is formed generally in a U-shape toward the inboard side.

10. The axle bearing assembly according to claim 1, wherein a portion of the second sealing member is disposed axially inward of an axially innermost portion of the outer ring.

11. An axle bearing assembly comprising:

a bearing portion equipped with an inner ring fixed to a stationary shaft, an outer ring on which a wheel is mounted on an outboard side, and a rolling element disposed between the inner ring and the outer ring;

a first sealing member that is fixed to an inboard side of the bearing portion between the inner ring and the outer ring; and a removable second sealing member that is disposed at an inboard side of the first sealing member the second sealing member including a cover portion which is formed generally in a U-shape toward an outboard side, and which is accommodated in a gap between the inner ring and the outer ring on an inboard side of the bearing portion in such a manner that the cover portion does not rotate relative to the outer ring for covering the gap, wherein a portion of the second sealing member is disposed inboard of an inboard-side end of the outer ring of the bearing portion.

12. The axle bearing assembly according to claim 11, wherein the second sealing member is composed of a circular plate which includes a fitting hole which is formed at a central portion of the circular plate, the cover portion covering the gap between the inner ring and the outer ring and a press-fitted portion which is press-fitted in the outer ring.

13. The axle bearing assembly according to claim 11, wherein the second sealing member further comprises a circular metal plate including a fitting hole which is formed at a central portion of the metal plate, and which has a diameter sufficient to loosely fit an outer periphery of the inner ring of the bearing portion therein, and the cover portion.

14. The axle bearing assembly according to claim 13, wherein the second sealing member further comprises, radially outward of the cover portion, a press-fitted portion which is recessed toward the outboard side, and which is press-fitted to the inboard-side end of the outer ring of the bearing portion.

15. The axle bearing assembly according to claim 11, wherein the second sealing member further comprises an annular pulser portion or a cylindrical pulser portion that is centered around an axis of rotation of the outer ring.

* * * * *